(12) United States Patent
Bora

(10) Patent No.: US 11,481,137 B2
(45) Date of Patent: Oct. 25, 2022

(54) DATA REPLICATION TECHNIQUES

(71) Applicant: EMC IP Holding Company LLC, Hopkinton, MA (US)

(72) Inventor: Bhaskar Bora, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 492 days.

(21) Appl. No.: 16/260,668

(22) Filed: Jan. 29, 2019

(65) Prior Publication Data
US 2020/0241755 A1 Jul. 30, 2020

(51) Int. Cl.
*G06F 3/06* (2006.01)
*H04L 67/104* (2022.01)
*G06F 16/27* (2019.01)

(52) U.S. Cl.
CPC .............. *G06F 3/065* (2013.01); *G06F 3/067* (2013.01); *G06F 3/0611* (2013.01); *G06F 16/275* (2019.01); *H04L 67/104* (2013.01)

(58) Field of Classification Search
CPC ...... G06F 3/0635; G06F 3/065; G06F 3/0611; G06F 3/067; H04L 67/104
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 10,310,760 B1* | 6/2019 | Dreier | G06F 16/1827 |
| 2002/0082807 A1* | 6/2002 | Turicchi, Jr. | G06F 11/3419 |
| | | | 702/186 |
| 2006/0248306 A1* | 11/2006 | Suishu | G06F 3/067 |
| | | | 711/170 |

(Continued)

OTHER PUBLICATIONS

EMC Corporation, "EMC Symmetrix Remote Data Facility (SRDF)", Connectivity Guide, P/N 300-885, Rev A10, Jan. 2013.

(Continued)

*Primary Examiner* — Apu M Mofiz
*Assistant Examiner* — Farhad Agharahimi
(74) *Attorney, Agent, or Firm* — Muirhead and Saturnelli, LLC

(57) ABSTRACT

Techniques for determining replication modes may include: issuing, while unsolicited data transfer mode is enabled for a first link, first write operations over the first link; issuing, while unsolicited data transfer mode is disabled for the first link, second write operations over the first link; determining a first performance metric for the first link in accordance with the first write operations; determining a second performance metric for the first link in accordance with the second write operations; and determining, in accordance with the first and second performance metrics whether to enable or disable unsolicited data transfer mode for the first link for a first time period. The first and second performance metrics may be response times. Unsolicited data transfer mode, when enabled, allows write data payload to be sent to a target without receiving an acknowledgement regarding receipt of a write command block for the write operation from the target.

20 Claims, 11 Drawing Sheets

(56) References Cited

U.S. PATENT DOCUMENTS

| | | | |
|---|---|---|---|
| 2008/0005289 A1* | 1/2008 | Ghanem | G06F 3/0635 709/220 |
| 2008/0093450 A1* | 4/2008 | Yoshida | G06F 3/0661 235/435 |
| 2015/0199148 A1* | 7/2015 | Hrischuk | G06F 3/0653 711/114 |

OTHER PUBLICATIONS

"VMAX3 Solutions Design Student Guide", Education Services, Revision No. MR-7XP-VMAXSD.5977.1, Jul. 2015.

* cited by examiner

MAIN STATE MACHINE:
Srt_state_machine()
If (assessment is active) /* within 4 second assessment period **/ —— 502
{
    If(assessment completed)    /* 4 second assessment period completed **/ —— 504
    {
        /* set unsolicited data transfer mode for next 2 minutes based on
        first and second overall average RTs */
        If(SRT ON RT ≤ SRT OFF RT) —— 506
            SET MODE TO SRT ON; —— 508
        else SET MODE TO SRT OFF; —— 510
        Clear assessment active indication; —— 512
        /* turn off/clear indicator since assessment done */
    }  ⎫
       ⎬ —— 503
       ⎭
    If(assessment is for SRT ON) —— 514
        Set to SRT OFF; —— 516
}
Else if(2 mins have elapsed since last assessment completion) —— 520
{
    Clear internal variables; —— 522
    Set assessment indication for the replication link; —— 524
}

| 302 Dynamic Assessment Mode Setting | 304 Unsolicited Data Transfer Mode Setting | 306 Action |
|---|---|---|
| 1 | X/don't care | Unsolicited data transfer mode is dynamically and automatically determined over time |
| 0 | 0 | Unsolicited data transfer mode remains disabled until manually modified. |
| 0 | 1 | Unsolicited data transfer mode remains enabled until manually modified. |

FIG. 10

DATA REPLICATION TECHNIQUES

BACKGROUND

Technical Field

This application generally relates to data storage and techniques for data replication.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of determining replication modes comprising: issuing, while unsolicited data transfer mode is enabled for a first link, a first set of one or more write operations over the first link, wherein the first link is used for data replication between a first system and a second system, wherein the unsolicited data transfer mode, when enabled for the first link, allows the first system to send write data payload of a write operation to the second system over the first link without receiving an acknowledgement from the second system regarding receipt of a write command block for the write operation; issuing, while unsolicited data transfer mode is disabled for the first link, a second set of one or more write operations over the first link, wherein the unsolicited data transfer mode, when disabled for the first link, does not send write data payload of the write operation to the second system over the first link without receiving the acknowledgement from the second system regarding receipt of a write command block for the write operation; determining a first response time for the first link in accordance with said issuing the first set of one or more write operations from the first system to the second system while unsolicited data transfer mode is enabled; determining a second response time for the first link in accordance with said issuing the first set of one or more write operations from the first system to the second system while unsolicited data transfer mode is disabled; and determining, in accordance with the first response time and the second response time, whether to enable or disable unsolicited data transfer mode for the first link for a first time period. It may be determined, in accordance with the first response time and the second response time, to enable the unsolicited data transfer mode for the first link for the first time period. The method may include receiving a client write operation; sending a first write command block for the client write operation from the first system to the second system over the first link; and sending first write data payload for the client write operation from the first system to the second system over the first link, wherein the first write data payload for the client write operation is sent from the from the first system to the second system prior to the first system receiving an acknowledgement from the second system regarding receipt of the first write command block. It may be determined, in accordance with the first response time and the second response time, to disable the unsolicited data transfer mode for the first link for the first time period. The method may include receiving a client write operation; sending a first write command block for the client write operation from the first system to the second system over the first link; receiving an acknowledgement from the second system regarding receipt of the first write command block; and responsive to receiving the acknowledgement from the second system regarding receipt of the first write command block, sending first write data payload for the client write operation from the first system to the second system over the first link, wherein the first write data payload for the client write operation is only sent from the from the first system to the second system upon receiving the acknowledgement from the second system regarding receipt of the first write command block. The steps of enabling unsolicited data transfer mode for the first link, issuing the first set of one or more write operations, disabling unsolicited data transfer mode, issuing, the second set of one or more write operations, determining a first response time for the first link, determining a second response time for the first link, and determining, in accordance with the first response time and the second response time, whether to enable or disable unsolicited data transfer mode for the first link may be included in first processing performed with respect to the first link. The method may include repeating said first processing for the first link after the first time period has elapsed. The first processing may be included in dynamic assessment mode processing having an associated setting capable of being enabled or disabled. When the associated setting of dynamic assessment mode processing is enabled, the assessment processing may be performed periodically to dynamically and automatically determine whether to enable or disable unsolicited data transfer mode for the first link at multiple points in time. When the associated setting of dynamic assessment mode processing is disabled, the first processing may not be performed and another setting is used to determine whether to enable or disable unsolicited data transfer mode for the first link. Another setting may be any of a user-specified, manual, configuration, and default setting indicating whether to enable or disable unsolicited data transfer mode for the first link. The method may include determining, in accordance with a current replication mode, whether to enable or disable dynamic assessment mode processing to enable or disable. The method may include determining whether the current replication mode is included in a specified set of one or more replication modes; and responsive to determining the current replication mode is included in the specified set of one or more replication modes, enabling dynamic assessment mode processing, and otherwise disabling dynamic assessment mode processing. The specified set may include synchronous replication. The specified set may include active-active replication wherein a client is allowed to issue I/O operations to the first system and also allowed to issue writes to the second system and wherein write data of client I/O operations may be replicated over the first link using synchronous write operations. Determining, in accordance with the first response time and the second response time, whether to enable or disable unsolicited data transfer mode for the first link for a first time period may include determining, in accordance with a specified tolerance limit, whether the first response time is less than or equal to the second response time; and responsive to determining, in accordance with the specified tolerance limit, that the first response time is less than or equal to the second response time, enabling unsolicited data transfer mode for the first link, and otherwise disabling unsolicited data transfer mode for the first link. The method may include enabling unsolicited data transfer mode for the first link used for data replication between a first system and a second system for a first time window; issuing, during the first time window while unsolicited data transfer mode is enabled for the first link, a first plurality of write operations over the first link; disabling unsolicited data transfer mode for the first link used for data replication between a first system and a second system for a second time window; issuing, during the second time window while unsolicited data transfer mode is disabled for the first link, a second plurality of write operations over the first link; enabling unsolicited data transfer mode for the first link used for data replication between a first system and a second system for a third time window; issuing, during the third time window while unsolicited data transfer mode is enabled for the first link, a third plurality of write operations over the first link; disabling, unsolicited data transfer mode for the first link used for data replication between a first system and a second system for a fourth time window; and issuing, during the first time window while unsolicited data transfer mode is disabled for the first link, a fourth plurality of write operations over the first link. The first response time for the first link may be determined in accordance with measured response times for a write operation including the first plurality and the third plurality, and wherein the second response time for the first link may be determined in accordance with measured response times for write operations including the second plurality and the fourth plurality.

In accordance with another aspect of techniques herein is a computer readable medium comprising code stored thereon that, when executed, performs a method of determining replication modes comprising: issuing, while unsolicited data transfer mode is enabled for a first link, a first set of one or more write operations over the first link, wherein the first link is used for data replication between a first system and a second system, wherein the unsolicited data transfer mode, when enabled for the first link, allows the first system to send write data payload of a write operation to the second system over the first link without receiving an acknowledgement from the second system regarding receipt of a write command block for the write operation; issuing, while unsolicited data transfer mode is disabled for the first link, a second set of one or more write operations over the first link, wherein the unsolicited data transfer mode, when disabled for the first link, does not send write data payload of the write operation to the second system over the first link without receiving the acknowledgement from the second system regarding receipt of a write command block for the write operation; determining a first response time for the first link in accordance with said issuing the first set of one or more write operations from the first system to the second system while unsolicited data transfer mode is enabled; determining a second response time for the first link in accordance with said issuing the first set of one or more write operations from the first system to the second system while unsolicited data transfer mode is disabled; and determining, in accordance with the first response time and the second response time, whether to enable or disable unsolicited data transfer mode for the first link for a first time period.

In accordance with another aspect of techniques herein is a system comprising: a processor; and a memory comprising code stored thereon that, when executed, performs a method of determining replication modes comprising: issuing, while unsolicited data transfer mode is enabled for a first link, a first set of one or more write operations over the first link, wherein the first link is used for data replication between a first system and a second system, wherein the unsolicited data transfer mode, when enabled for the first link, allows the first system to send write data payload of a write operation to the second system over the first link without receiving an acknowledgement from the second system regarding receipt of a write command block for the write operation; issuing, while unsolicited data transfer mode is disabled for the first link, a second set of one or more write operations over the first link, wherein the unsolicited data transfer mode, when disabled for the first link, does not send write data payload of the write operation to the second system over the first link without receiving the acknowledgement from the second system regarding receipt of a write command block for the write operation; determining a first performance metric for the first link in accordance with said issuing the first set of one or more write operations from the first system to the second system while unsolicited data transfer mode is enabled; determining a second performance metric for the first link in accordance with said issuing the first set of one or more write operations from the first system to the second system while unsolicited data transfer mode is disabled; and determining, in accordance with the first performance metric and the second performance metric, whether to enable or disable unsolicited data transfer mode for the first link for a first time period. The first performance metric and the second performance metric may both be response times or both data transfer rates.

BRIEF DESCRIPTION OF THE DRAWINGS

Features and advantages of the present invention will become more apparent from the following detailed description of exemplary embodiments thereof taken in conjunction with the accompanying drawings in which:

FIG. 9 is an example of a C-like pseudo-code representation of a state machine that may be used in an embodiment in accordance with techniques herein; and FIG. 10 is an example of a table illustrating actions that may be taken in connection with different settings in an embodiment in accordance with techniques herein.

DETAILED DESCRIPTION OF EMBODIMENT(S)

Figure 1:
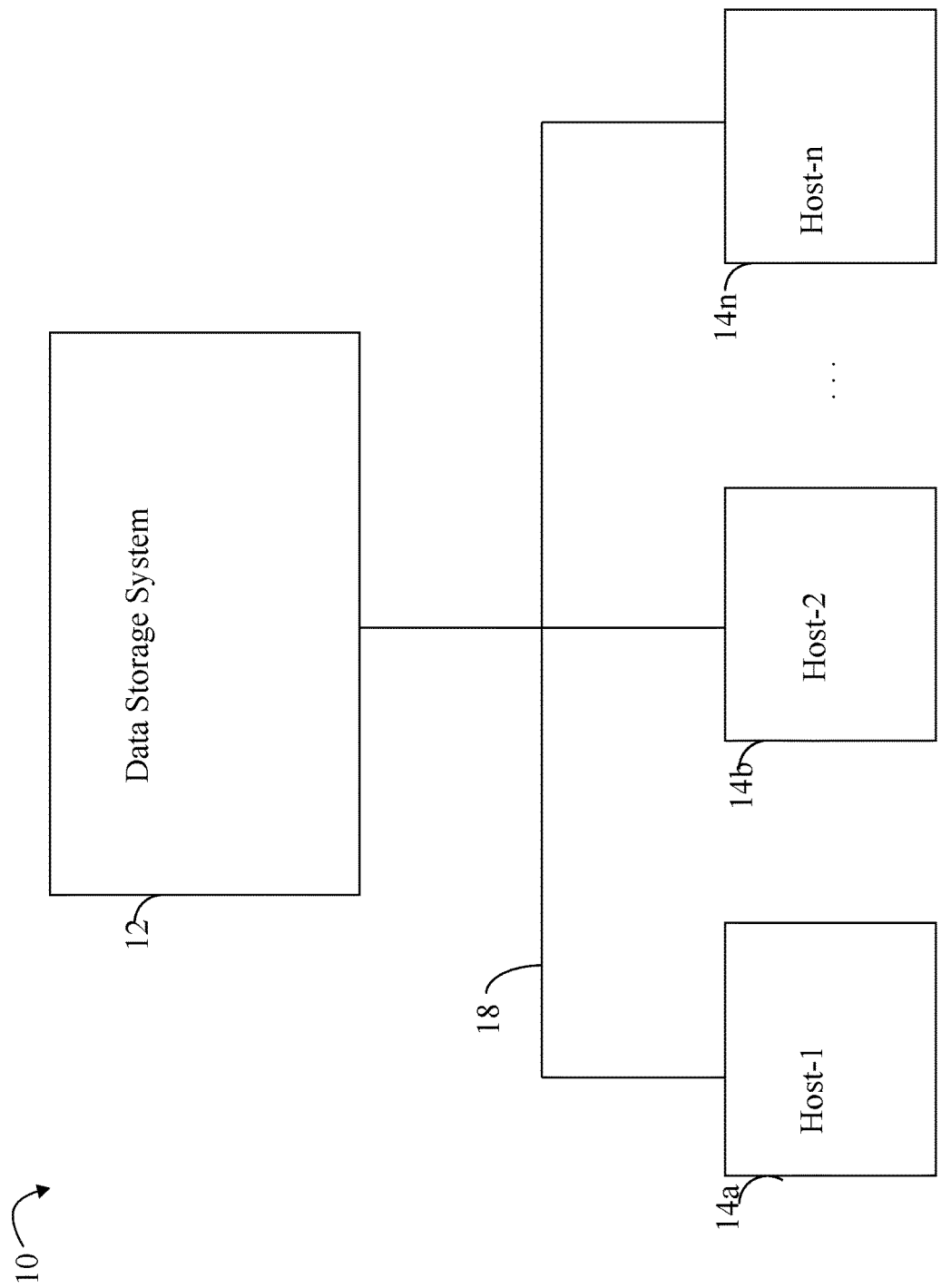
FIG. 1 is an example of an embodiment of components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), as well as, more generally, any suitable file-based protocol or block-based protocol. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array, as well one or more other data storage systems as may vary with the embodiment.

Figure 2A:
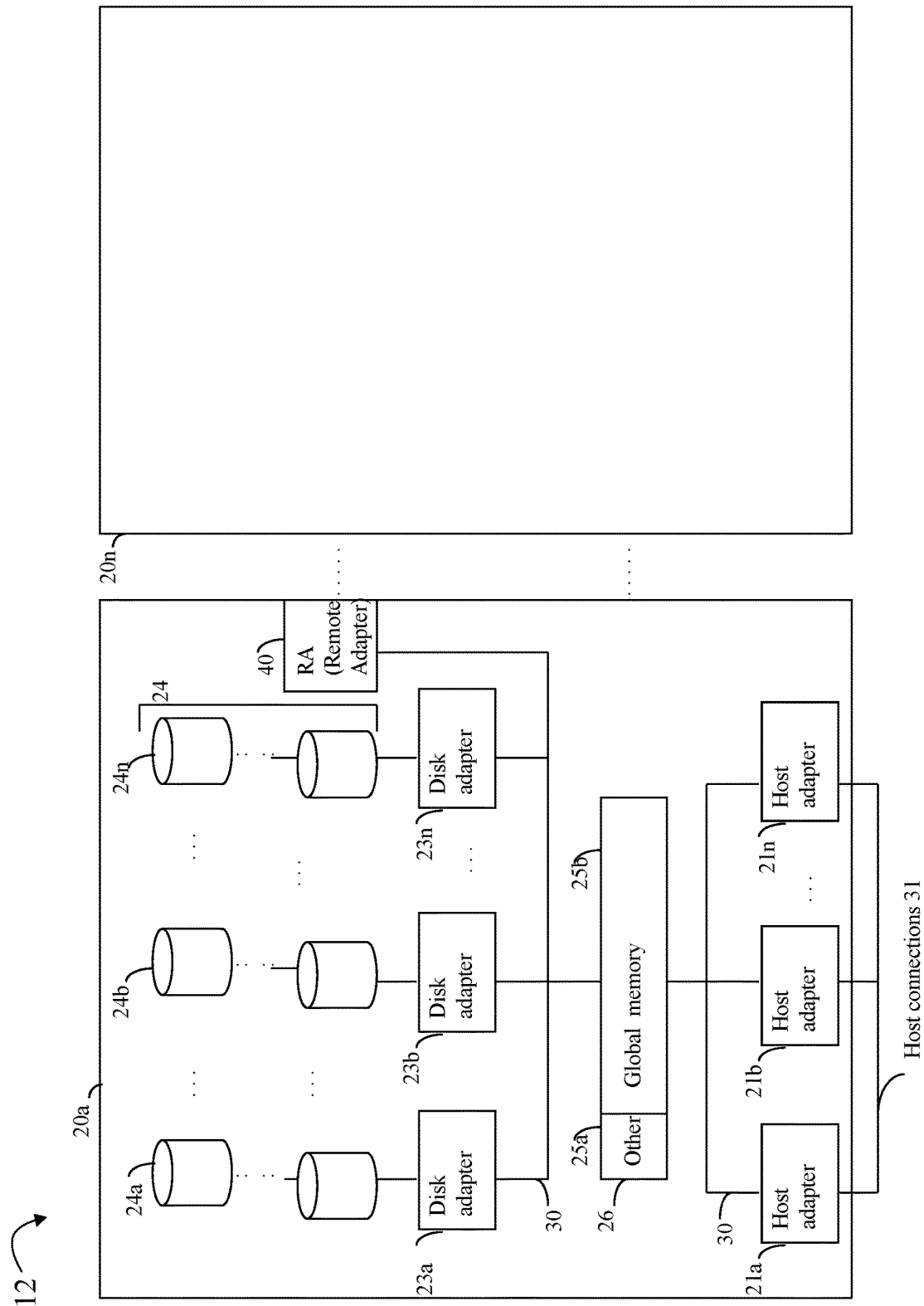
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
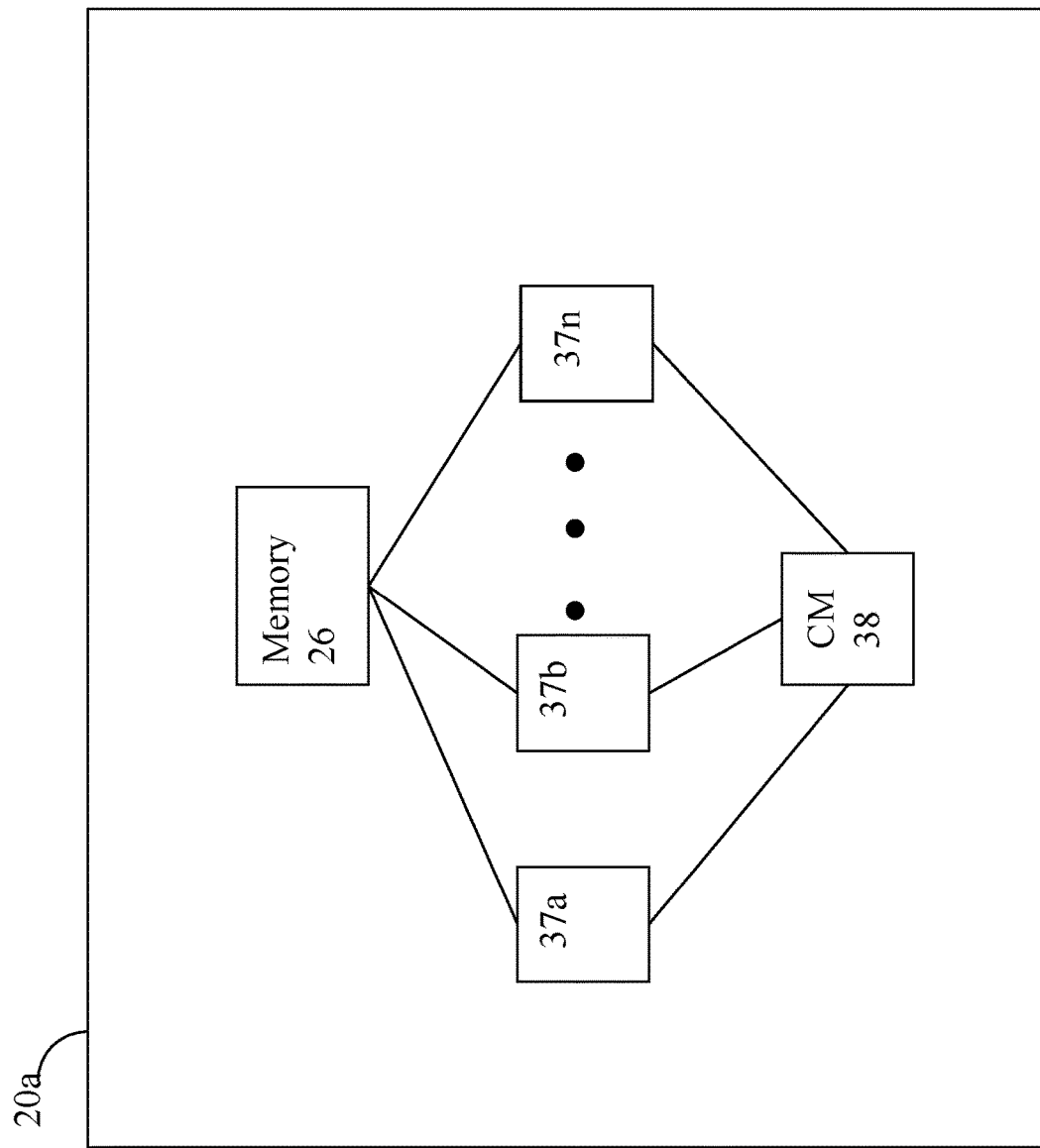
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one to the other synchronously or asynchronously. Generally, the Dell EMC™ SRDF® products are one example of commercially available products that may be used to provide functionality of a remote data facility (RDF) for use in an embodiment in connection with techniques herein.

Figure 3:
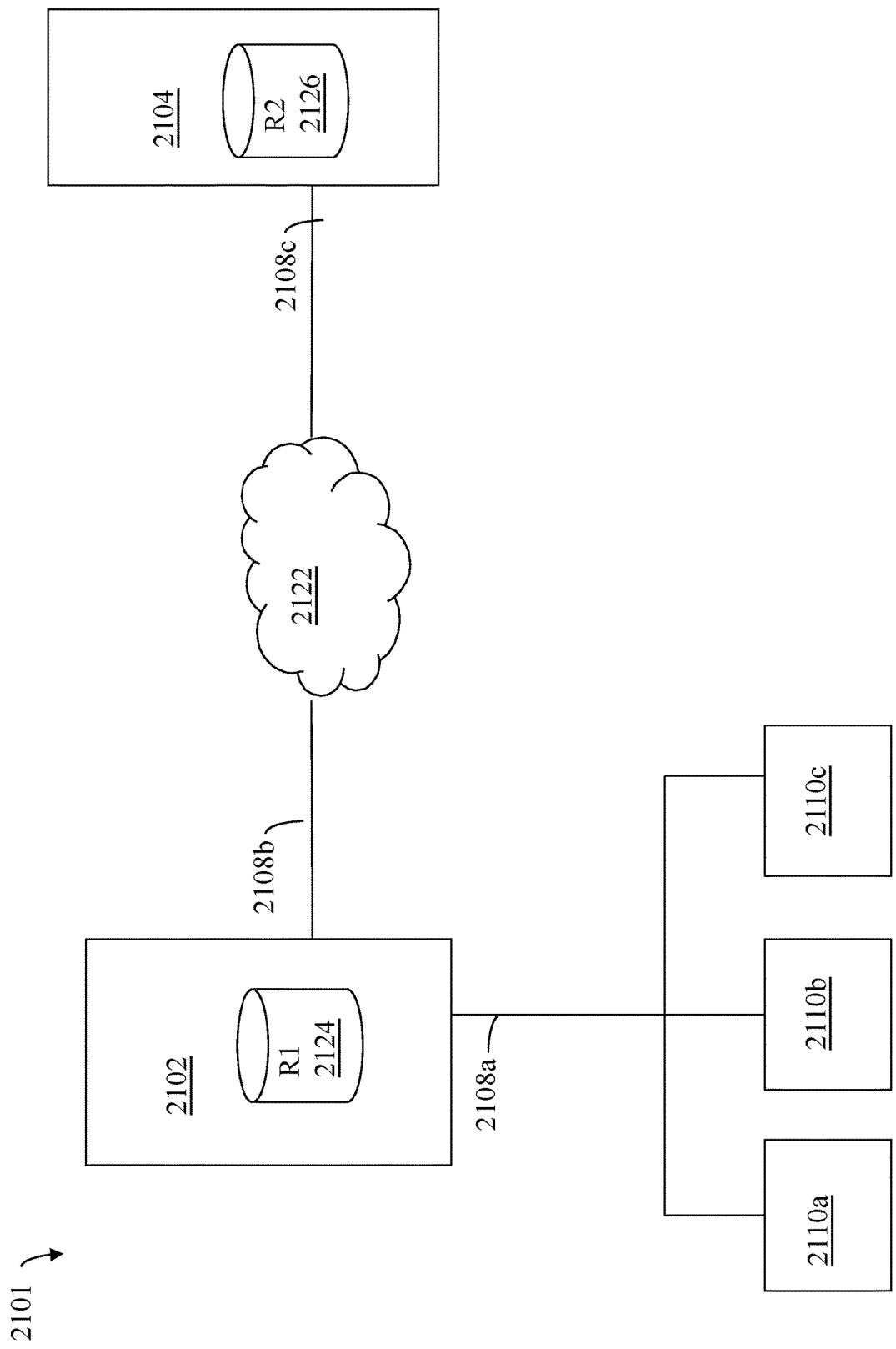
FIGS. 3, 4 and 5 are examples of various embodiments of components configured for replication.

Referring to FIG. 3, shown is an example of an embodiment of a system 2101 that may be used in connection with the techniques described herein. It should be noted that the embodiment illustrated in FIG. 3 presents a simplified view of some of the components illustrated in FIGS. 1 and 2A, for example, including only some detail of the data storage systems 12 for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c may also be directly connected to a network such as the Internet.

The data storage systems 2102 and 2104 may include one or more devices. In this example, data storage system 2102 includes storage device R1 2124 and data storage system 104 includes storage device R2 2126. Both of the data storage systems may include one or more other logical and/or physical devices. Data storage system 2102 may be characterized as local with respect to hosts 2110a, 2110b and 2110c. Data storage system 104 may be characterized as remote with respect to hosts 2110a, 2110b and 2110c. The R1 and R2 device may be configured as LUNs.

The host 1210a may issue a command, such as to write data to device R1 of data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Dell EMC™ SRDF® products. Data storage device communication between data storage systems using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first storage device, such as R1, as a master storage device and a second storage device, such as R2, as a slave storage device. Other incarnations of Dell EMC™ SRDF® may provide a peer to peer relationship between the local and remote storage devices. In this example, the host 2110a interacts directly with the device R1 of data storage system 2102, but any data changes made are automatically provided to the R2 device of data storage system 2104 using Dell EMC™ SRDF®. In operation, the host 110a may read and write data using the R1 volume in 2102, and Dell EMC™ SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108b, 2108c to network 2122. Data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group in which one or more devices (e.g., LUNs) on a data storage system are associated with a particular group under the control of a single RA which services the devices included therein. Rather than have a single R1 device and a single R2 device, a grouping may be defined so that a source group of devices, such as on data storage system 2102, have corresponding target devices of a target group, such as devices on data storage system 2104. Devices in a source group may be mirrored in corresponding devices of a target group using Dell EMC™ SRDF® functionality.

Techniques herein may be used with Dell EMC™ SRDF®, or more generally any RDF, operating in one or more different supported modes. For example, such modes may include Dell EMC™ SRDF® operating in synchronous mode, asynchronous mode, or adaptive copy mode. For example, in connection with Dell EMC™ SRDF®, the host may issue a write to an R1 device in a first data storage system and the data change is propagated to the R2 device in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as Dell EMC™ SRDF® operating in an synchronous mode (Dell EMC™ SRDF®/S). With synchronous mode data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in synchronous mode, such as Dell EMC™ SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including write pending (WP) data as mentioned elsewhere herein. The write data may be propagated across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation.

Figure 4:
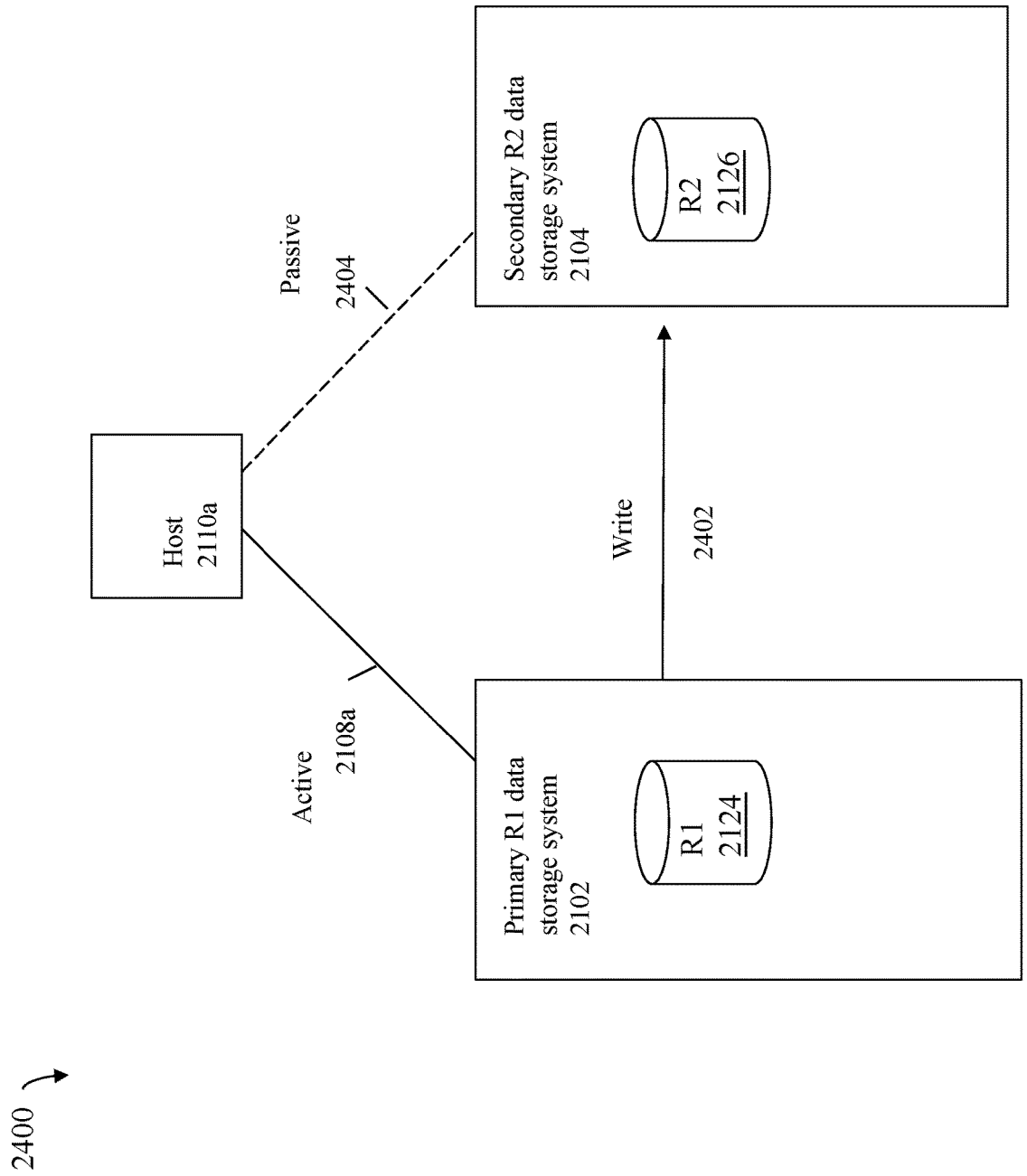

With reference to FIG. 4, shown is a further simplified illustration of components that may be used in an embodiment in accordance with techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

It should be noted although only a single RDF link 2402 is illustrated, more generally any number of RDF links may be used in connection with replicating data from systems 2102 to system 2104 in connection with techniques herein.

Figure 5:
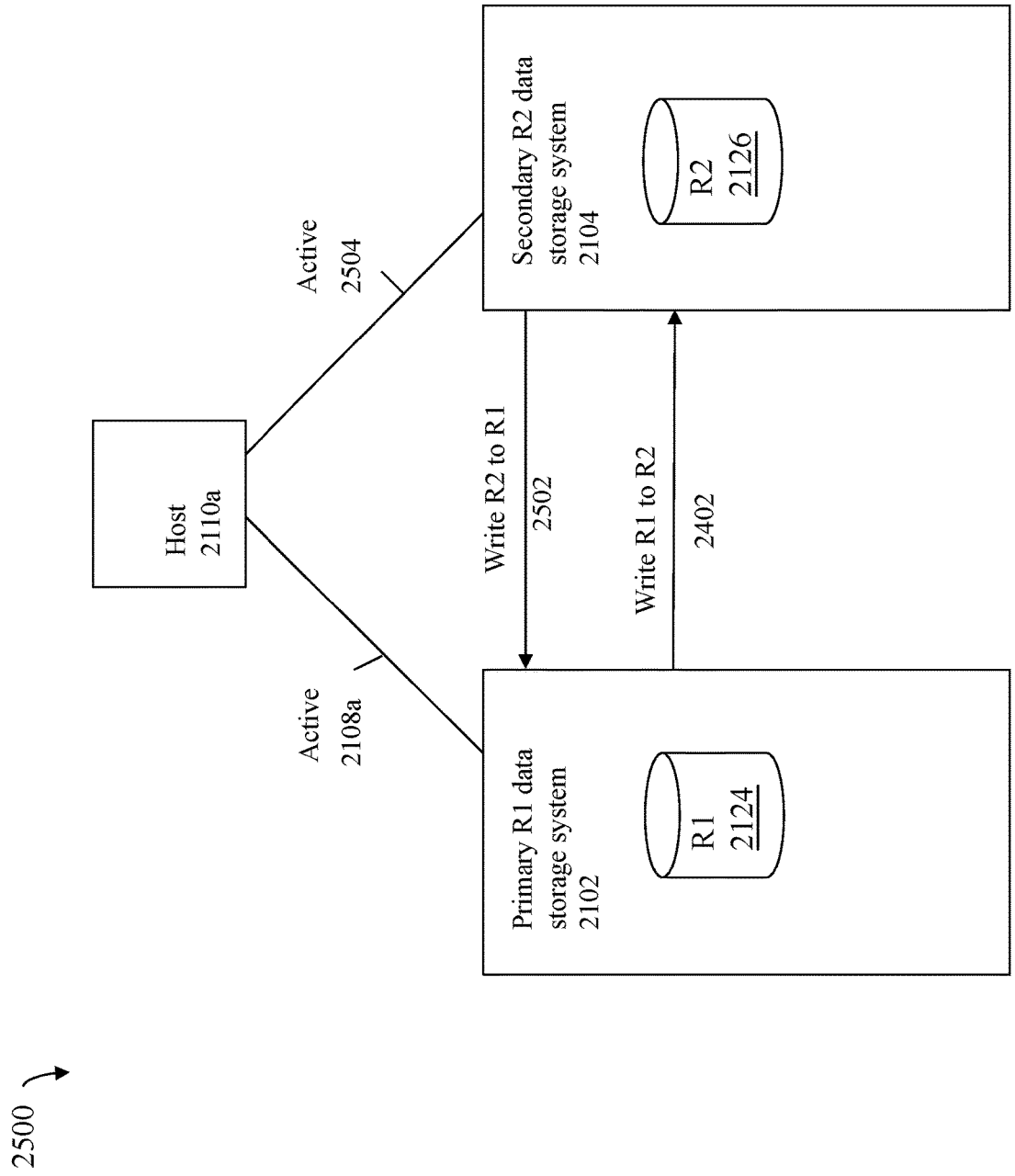

Referring to FIG. 5, shown is another example configuration of components that may be used in an embodiment in accordance with techniques herein. The example 2500 illustrates an active-active configuration as may be used in connection with synchronous replication in at least one embodiment in accordance with techniques herein. In an active-active configuration with synchronous replication, the host 2110a may have a first active path 2108a to the R1 data storage system and R1 device 2124 configured as LUN A. Additionally, the host 2110a may have a second active path 2504 to the R2 data storage system and R2 device 2126 configured as LUN A. From the view of the host 2110a, paths 2108a and 2504 appear as 2 paths to the same LUN A as described in connection with FIG. 4 with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is destaged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110a over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108a to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 5 has the R2 system 2104 act as another primary data storage system which facilitates propagation of writes received at the data storage system 2104 to the data storage system 2102. It should be noted that although FIG. 5 illustrates for simplicity a single host accessing both the R1 device 2124 and R2 device 2126, any number of hosts may access one or both of the R1 device 2124 and the R2 device 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with techniques herein, the Fibre Channel (FC) protocol may be used in connection with communications (e.g., over the SAN including the RDF links) between the data storage system 2102 and 2104.

Figure 6:
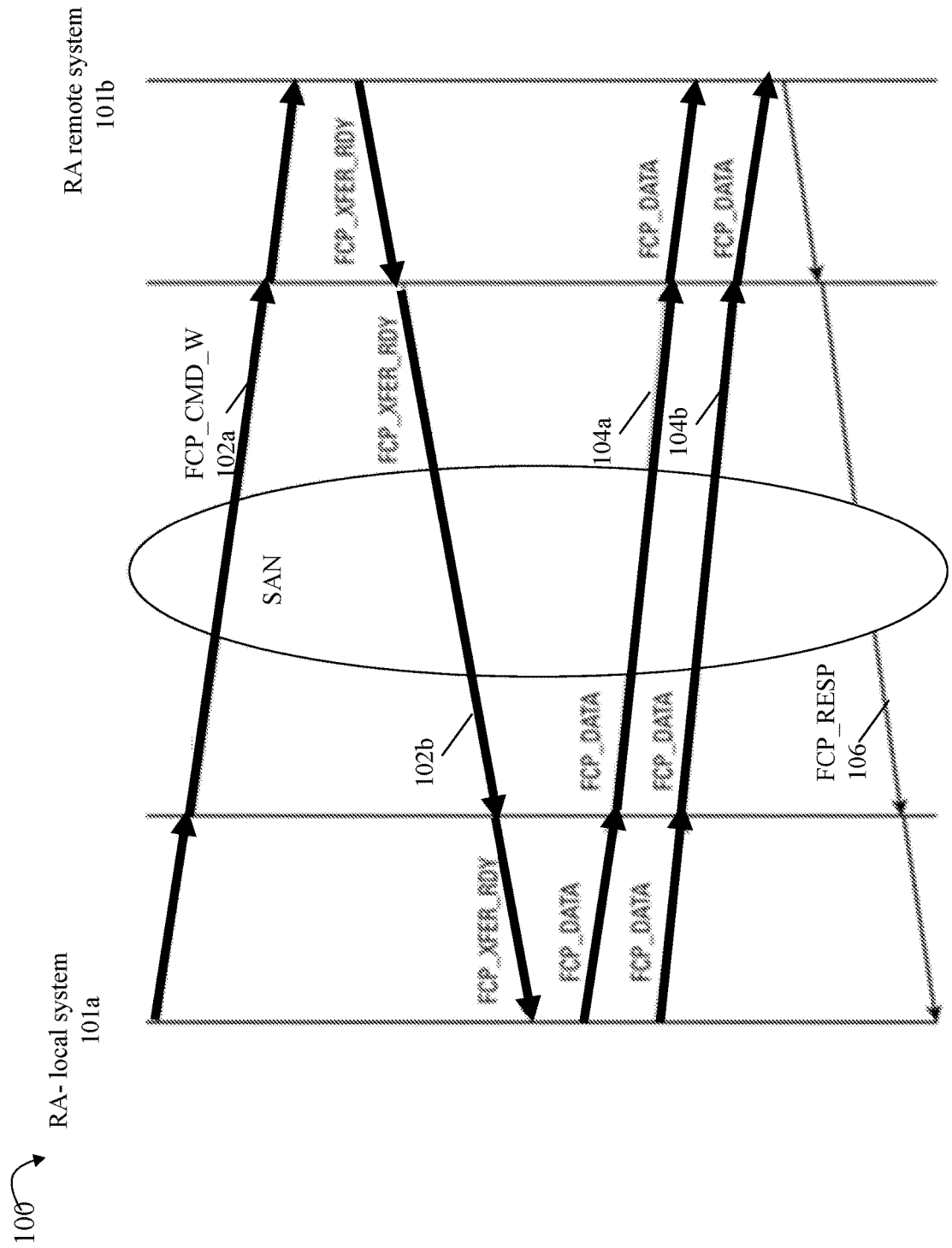
FIG. 6 is an example illustrating I/O flow of a write in connection with RDF when unsolicited or immediate data transfer mode is disabled as may be performed in an embodiment in accordance with techniques herein.

Referring to FIG. 6, shown is an example 100 illustrating the I/O flow for a single RDF write operation over an RDF link in an embodiment in accordance with techniques herein. The example 100 illustrates that a write command block (FCP_CMD_W) 102a is first issued from the RA of the local (e.g., R1 or source) data storage system 101a to the RA of the remote (e.g., R2 or remote) data storage system 101b at a first point in time. Upon receipt of the write command block, the RA of the remote system 101b sends an acknowledgement (FCP_XFER_RDY) 102b indicating receipt of the write command block and also indicating to the local R1 data storage system that the remote R2 data storage system is ready to receive the write data payload for the write command data block. Once the local R1 system 101*a* receives the acknowledgement 102*b*, the local R1 system 101*a* then commences the data transfer and transmits the write command data payload (e.g., write data) to be replicated to the remote R2 system. Elements 104*a*, 104*b* (FCP_DATA) illustrates the write command data payload transmitted from the RA of the local system 101*a* to the RA of the remote system 101*b* responsive to the local R1 system 101*a* receiving acknowledgement 102*b* from the remote system 101*b*. Once all the write data payload has been received by the RA of the remote system 101*b*, the remote R2 system 101*b* may send a response (FCP_RESP) to the local R1 system 101*a* indicating a statues of the write operation, such as indicating successfully receiving all the write payload data of the write operation. Generally, one or more frames of write data payload may be sent in connection with a single write command data block 102*a* although the example 100 illustrates two frames 104*a*, 104*b* of write payload data being transmitted.

As illustrated in FIG. 6, the I/O flow for a single write operation sent over an RDF link needs at least 2 round trips (over the RDF link). Thus, the write operation I/O latency may be characterized as generally proportional to twice the round trip time or latency with respect to sending communications between the local R1 system and the R2 remote system over an RDF link.

In efforts to improve the write operation latency, such as to keep the latency generally proportional to a single round trip time over the RDF link, an embodiment in accordance with techniques herein may allow the local R1 system to send the write payload data to the remote R2 system without waiting for the R1 local system to have received the acknowledgement 102*b*. In at least one embodiment, sending 102*b* may be omitted in connection with the I/O flow for the write operation. The local R1 system may begin sending the write payload data once the local R1 system has sent the write command data block 102*a*. The foregoing of sending the write data payload from the local R1 system to the remote R2 system without waiting to receive the acknowledgement 102*b* from the remote R2 system may be referred to herein as unsolicited data transfer mode or immediate data transfer mode.

Figure 7:
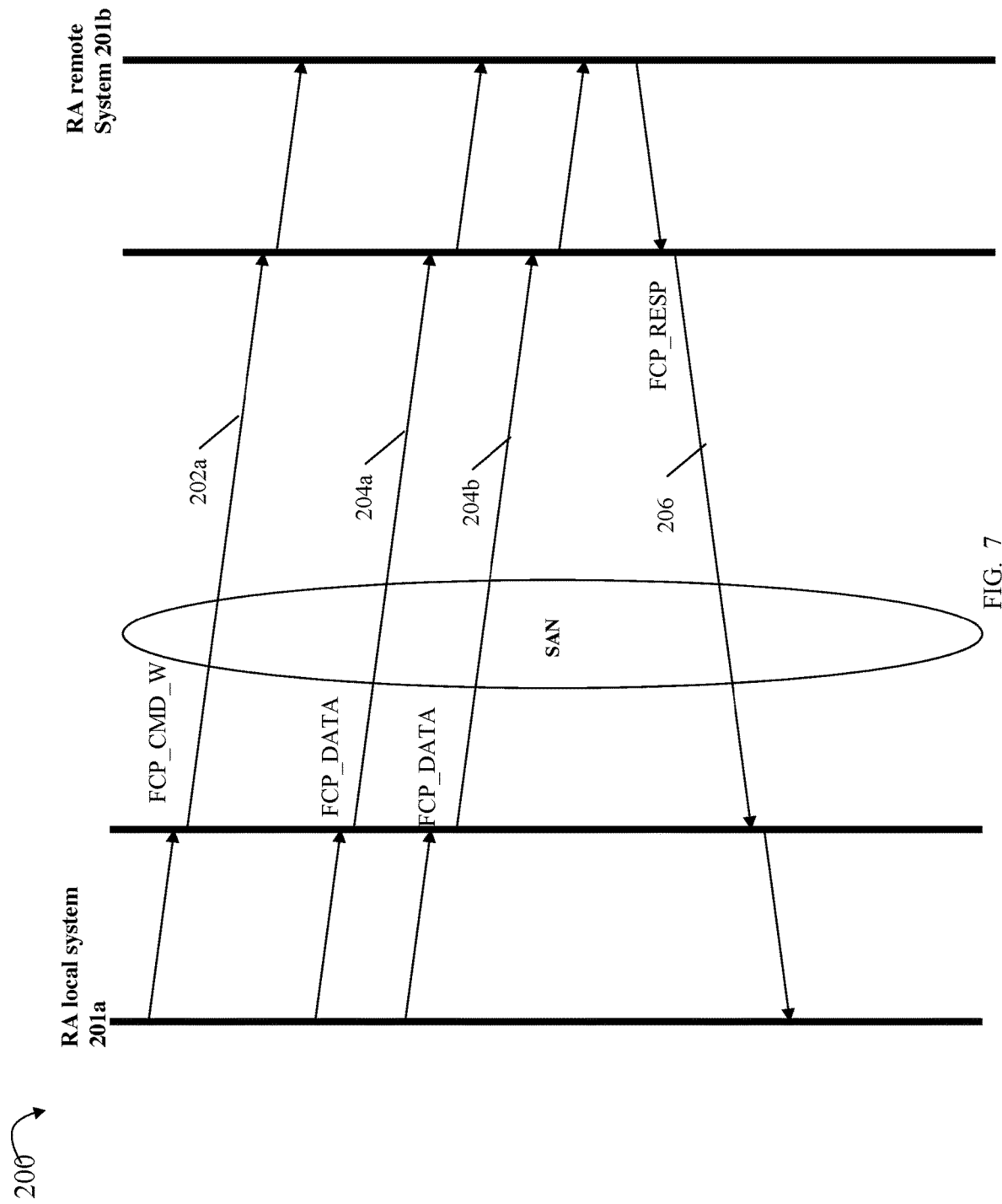
FIG. 7 is an example illustrating I/O flow of a write in connection with RDF when unsolicited or immediate data transfer mode is enabled as may be performed in an embodiment in accordance with techniques herein.

Referring to FIG. 7, shown is an example 100 illustrating the I/O flow for a single RDF write operation over an RDF link with unsolicited or immediate data transfer mode as may be performed in an embodiment in accordance with techniques herein. The example 200 illustrates that a write command block (FCP_CMD_W) 202*a* is first issued from the RA of the local (e.g., R1 or source) data storage system 201*a* to the RA of the remote (e.g., R2 or remote) data storage system 201*b* at a first point in time. Once the write command block 202*a* has been transmitted from the local R1 system 201*a*, the local R1 system 201*a* may begin sending the write command data payload for the write command data block 202*a*. Elements 204*a*, 204*b* (FCP_DATA) illustrate the write command data payload transmitted from the RA of the local system 101*a* to the RA of the remote system 101*b*. Once all the write data payload 204*a*, 204*b* has been received by the RA of the remote system 201*b*, the remote R2 system 201*b* may send a response (FCP_RESP) to the local R1 system 201*a* indicating a statues of the write operation, such as indicating successfully receiving all the write payload data of the write operation. Generally, one or more frames of write data payload may be sent in connection with a single write command data block 202*a* although the example 100 illustrates two frames 204*a*, 204*b* of write payload data being transmitted.

Thus, FIG. 6 is an example illustrating I/O flow of a write in connection with RDF when unsolicited or immediate data transfer mode is disabled as may be performed in an embodiment in accordance with techniques herein described in following paragraphs, and FIG. 7 is an example illustrating I/O flow of a write in connection with RDF when unsolicited or immediate data transfer mode is enabled as may be performed in an embodiment in accordance with techniques herein as described in following paragraphs.

Described in following paragraphs are techniques that may be used to assess whether the unsolicited data transfer mode should be enabled in order to improve response time. In at least one embodiment, such assessment may be performed automatically and periodically over time. In at least one embodiment, whether to perform the automated and dynamic assessment processing (regarding the unsolicited data transfer mode) may be selectively enabled or disabled. In at least one embodiment, the automated and dynamic assessment processing (regarding the unsolicited data transfer mode) may be performed for one or more selected replication modes or configurations, such as synchronous replication and/or active-active replication (e.g., FIG. 5). In at least one embodiment, the automated and dynamic assessment processing (regarding the unsolicited data transfer mode) may be performed per RDF or replication link. Thus, an assessment may be automatically performed periodically for each RDF or replication link in order to determine whether it is beneficial to enable unsolicited data transfer mode for that particular link at that particular point in time. As conditions related to, for example, network traffic, replication link traffic, network and link characteristics, setup and configuration, replication mode, host or client I/O workload pattern changes, and the like, may change or vary over time and with each RDF or replication link, assessment may be automatically repeated for each RDF or replication link in order to determine whether it is beneficial to enable unsolicited data transfer mode for that particular link at subsequent points in time.

In at least one embodiment, the techniques herein utilize an algorithm that assesses the usefulness of enabling unsolicited data transfer mode on a per replication or RDF link basis by empirically taking I/O response time (RT) measurements for each RDF link. RT measurements observed may be obtained per replication link overall independent of and irrespective of the particular LUN or RDF group for which the write operations over the replication link are performed. RT measurements may be taken over a period of time to see whether enabling or disabling unsolicited data transfer mode results in the best (e.g., lowest) RT. Processing may then set the unsolicited data transfer mode to have an associated state of enabled or disabled that minimizes RT for that particular replication link for a period of time. The foregoing may be repeated to reassess whether unsolicited data transfer mode should be enabled or disabled for the next period of time. In at least one embodiment, a state machine may be executed each time a next period of time elapses, such as every 2 minutes, where the state machine performs the assessment. Since the assessment is performed periodically, any change in conditions possibly affecting RT performance with respect to RDF or replication write operations sent over the link may be taken into account. Additionally, the assessment is performed with respect to individual replication links to provide for the best per link write RT performance.

What will now be described are additional details and example regarding an embodiment of techniques herein. In the example, particular details, such as amounts of time, are provided for illustration. One of ordinary skill in the art will appreciate that techniques herein are more generally applicable and not so limited to the particular details, such as specific amounts of time, in the examples herein.

In at least one embodiment as described below, techniques described herein may be performed with respect to synchronous replication, and thus, synchronous write operations issued over a replication link.

Figure 8:
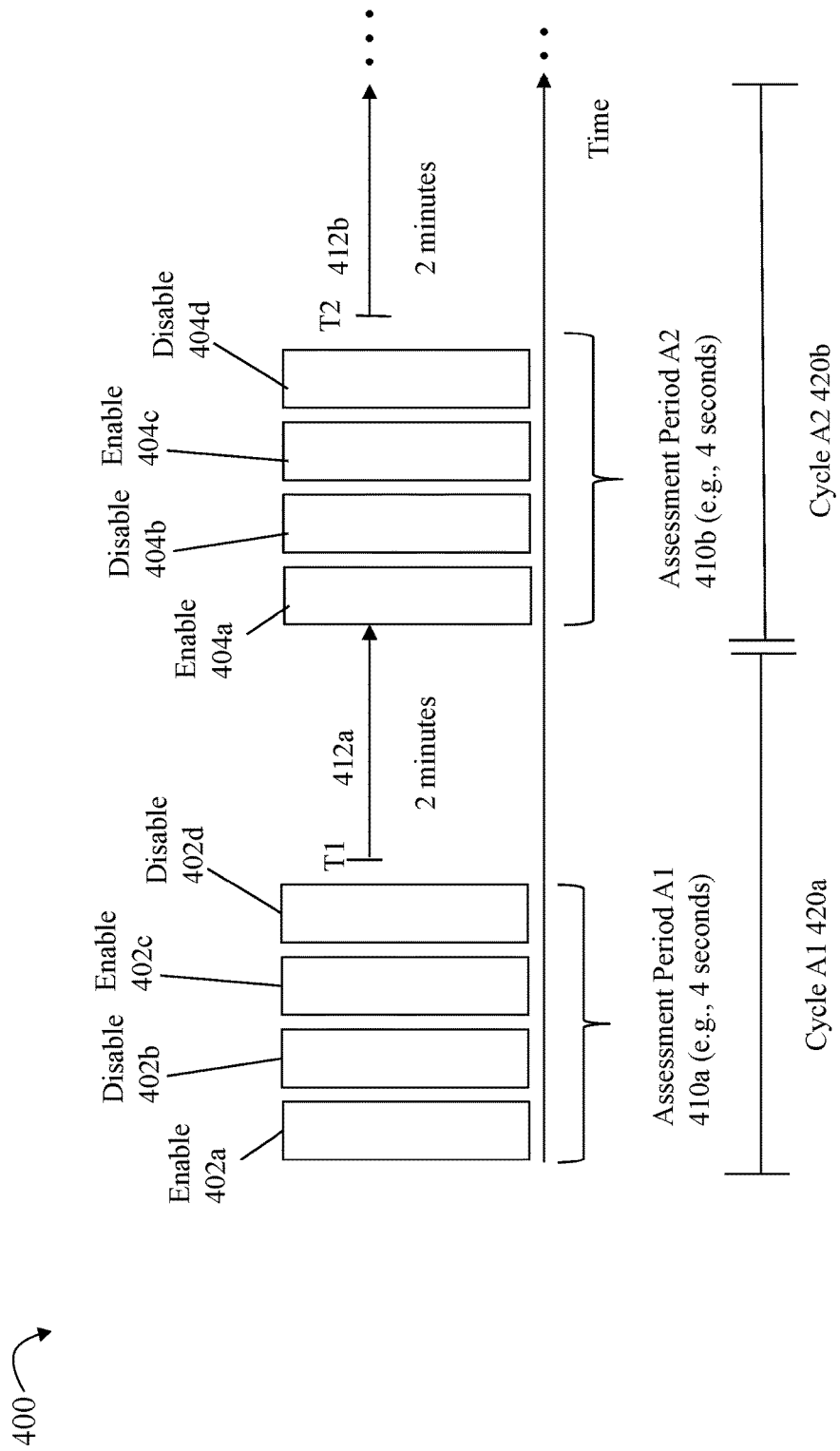
FIG. 8 is an example illustrating processing flow that may be performed in an embodiment in accordance with techniques herein.

Referring to FIG. 8, shown is an example 400 illustrating processing flow that may be performed in an embodiment in accordance with techniques herein. The processing of the example 400 may be performed for each individual replication link between a local R1 system and a remote R2 system.

Processing may be performed for a first assessment period A1 410a having a total elapsed time of 4 seconds. At a first point in time, the unsolicited data transfer mode is enabled for a replication link. For a first 1 second window of time 402a of the first assessment period 410a, a first average I/O RT for synchronous writes sent over the replication link is measured. After the first 1-second window of time 402a, the unsolicited data transfer mode is disabled for a replication link. For a second 1 second window of time 402b of the first assessment period 410a, a second average I/O RT for synchronous writes sent over the replication link is measured. After the second 1-second window of time 402b, the unsolicited data transfer mode is again enabled for the replication link. For a third 1 second window of time 402c of the first assessment period 410a, a third average I/O RT for synchronous writes sent over the replication link is measured. The third average I/O RT may be combined with the first average I/O RT to determine a first overall average I/O RT for synchronous write operations when the unsolicited data transfer mode is enabled. After the third 1-second window of time 402c, the unsolicited data transfer mode is again disabled for the replication link. For a fourth 1 second window of time 402d of the first assessment period 410a, a fourth average I/O RT for synchronous writes sent over the replication link is measured. The second average I/O RT may be combined with the fourth average I/O RT to determine a second overall average I/O RT for synchronous write operations when the unsolicited data transfer mode is disabled.

The foregoing 4 seconds may denote the first assessment period 410a. Consistent with discussion herein, during the first 1-second window 402a and third 1-second window 402c, synchronous write operations may be issued over the replication link having associated I/O flow as illustrated and described in connection with FIG. 7. Consistent with discussion herein, during the second 1-second window 402b and fourth 1-second window 402d, synchronous write operations may be issued over the replication link having associated I/O flow as illustrated and described in connection with FIG. 6.

After completion of the first assessment period 410a, at time T1, a determination is made (based on the first overall average I/O RT for synchronous write operations when the unsolicited data transfer mode is enabled and the second overall average I/O RTs for synchronous write operations when the unsolicited data transfer mode is disabled) whether to enable or disable the unsolicited data transfer mode for the next 2 minutes 412a. Generally, in at least one embodiment, if the first overall average I/O RT for synchronous write operations when the unsolicited data transfer mode is enabled is less than, or equal to, the second overall average I/O RT for synchronous write operations when the unsolicited data transfer mode is disabled, then the unsolicited data transfer mode is enabled for the next 2 minute time period 412a, and otherwise, the unsolicited data transfer mode is disabled for the next 2 minute time period 412a.

At the end of the 2 minute time period 412a, the foregoing assessment processing as performed during the first assessment period 410a may be repeated in a second 4-second assessment period A2 410b. In the second assessment period A2 410b (in a manner similar to that as described above for 410a), processing may be performed to measure the average I/O RT for alternating cycles when the unsolicited data transfer mode is enabled and disabled. In the assessment period A2 410b, a first overall average I/O RT for synchronous write operations when the unsolicited data transfer mode is enabled may be determined based on synchronous write operations issued over the replication link during the first 1-second window 404a and third 1-second window 404c of the second assessment period 410b with the unsolicited data transfer mode enabled; and a second overall average I/O RT for synchronous write operations when the unsolicited data transfer mode is disabled may be determined based on synchronous write operations issued over the replication link during the second 1-second window 404b and fourth 1-second window 404d of the second assessment period 410b with the unsolicited data transfer mode enabled.

Consistent with discussion herein, during the first 1-second window 404a and third 1-second window 404c, synchronous write operations may be issued over the replication link having associated I/O flow as illustrated and described in connection with FIG. 7. Consistent with discussion herein, during the second 1-second window 404b and fourth 1-second window 404d, synchronous write operations may be issued over the replication link having associated I/O flow as illustrated and described in connection with FIG. 6.

After completion of the second assessment period 410b, at time T2, a determination is made (based on the first overall average I/O RT for synchronous write operations when the unsolicited data transfer mode is enabled and the second overall average I/O RTs for synchronous write operations when the unsolicited data transfer mode is disabled) whether to enable or disable the unsolicited data transfer mode for the next 2 minutes 412b. Generally, in at least one embodiment, if the first overall average I/O RT for synchronous write operations when the unsolicited data transfer mode is enabled is less than, or equal to, the second overall average I/O RT for synchronous write operations when the unsolicited data transfer mode is disabled, then the unsolicited data transfer mode is enabled for the next 2 minute time period 412b, and otherwise, the unsolicited data transfer mode is disabled for the next 2 minute time period 412b.

The foregoing assessment processing performed during the second assessment period A2 410b, subsequent selection of whether to enable or disable the unsolicited data transfer mode, and then setting the unsolicited data transfer mode to be enabled/disabled based on the selection for a subsequent 2 minute time period may be repeated in a continual ongoing manner for the replication link.

In at least one embodiment, additional processing may be performed to handle a case where, after one of the assessment periods, the first and second overall average I/O RTs for synchronous write operations are within a specified tolerance limit of one another, the two overall average RTs may be considered as matching whereby the unsolicited data transfer mode may be set to enable for the next 2 minute time period. For example, the mathematical difference (diff) as in EQUATION 1 may be calculated:

Difference (Diff)=first overall average RT (when unsolicited data transfer mode is enabled)−second overall average RT (when unsolicited data transfer mode is disabled)

If the difference (as in EQUATION 1) is less than the specified tolerance limit, then the two overall average RTs may be considered as matching whereby the unsolicited data transfer mode may be set to enable for the next 2 minute time period. Any suitable value may be selected as the tolerance limit for determining whether the two overall average RTs may be considered as matching. For example, in at least one embodiment, the tolerance limit may 1% of the sum of the two overall average RTs.

In connection with the foregoing, a cycle may include a single complete iteration of an assessment period/processing, selecting (in accordance with the assessment period) whether to enable or disable the unsolicited data transfer mode for a 2 minute time period, setting the unsolicited data transfer mode to the selected setting of enabled or disabled, and then waiting for the 2 minute time period to elapse. For example, the foregoing assessment processing performed during the first assessment period A1 410a, subsequent selection of whether to enable or disable the unsolicited data transfer mode, and then setting the unsolicited data transfer mode to be enabled/disabled based on the selection for a subsequent 2 minute time period 412a may comprise a single cycle A1 420a. The foregoing assessment processing performed during the second assessment period A2 410b, subsequent selection of whether to enable or disable the unsolicited data transfer mode, and then setting the unsolicited data transfer mode to be enabled/disabled based on the selection for a subsequent 2 minute time period 412b may comprise a single cycle A2 420b. In a similar manner, processing as described above may be repeated for subsequent cycles.

Referring to FIG. 9, shown is an example of a C-like pseudo-code representation of a state machine that may be used in an embodiment in accordance with techniques herein. The example 500 illustrates processing that may be performed by a state machine executed every one second to perform processing consistent with discussion above in connection with FIG. 8. In the example 500, SRT refers to the unsolicited data transfer mode, SRT OFF refers to disabling the unsolicited data transfer mode, and SRT ON refers to enabling the unsolicited data transfer mode. In connection with the example 500 in at least one embodiment for the 4-second assessment period, the initial state for the first 1-second window may be set to SRT ON, the second 1-second window is set to SRT OFF, the third 1-second window may be set to SRT ON, and the fourth 1-second window is set to SRT OFF.

Line 502 is a conditional statement that is determining whether an assessment period is active. If 502 evaluates to yes, it means the current 1-second window of time during which the code of 500 is executing is within an active assessment period.

If step 502 evaluates to yes, processing proceeds to line 504. At line 504, a determination is made as to whether a current assessment time period has just completed. If the determination of line 504 evaluates to yes, control proceeds to line 506. At line 506, a determination is made as to whether the overall average I/O response time (RT) measured while the unsolicited data transfer mode was enabled (SRT ON RT) is less than or equal to the overall average I/O response time (RT) measured while the unsolicited data transfer mode was disabled (SRT OFF RT). If line 506 evaluates to yes, line 508 is executed where the unsolicited data transfer mode (MODE) is enabled (set to SRT ON) for the next 2 minutes. If line 506 evaluates to no, line 510 is executed where the unsolicited data transfer mode (MODE) is disabled (set to SRT OFF) for the next 2 minutes. From lines 508 and 510, control proceeds to step 512 to clear or turn off the assessment active indicator since the assessment period has completed and the setting for the unsolicited data transfer mode determined (e.g., lines 506, 508 and 510) for the next 2 minutes.

Following execution of the processing denoted by the logic of 503 as described above, control proceeds to line 514. At line 514, a determination is made as to whether the assessment processing is set for SRT ON (enabled). If line 514 evaluates to yes, then control proceeds to 516 to set assessment processing for the next 1 second window to SRT OFF (disabled). In this manner, based on 514 and 516, the unsolicited data transfer mode may alternate between enabled and disabled in alternating 1-second time windows of the assessment period.

If the determination of line 502 evaluates to no, control proceeds to line 520 where a determination is made as to whether 2 minutes has elapsed since the last assessment period completion. If line 520 evaluates to yes, processing of steps 522 and 524 is performed. At step 522, internal variables may be cleared for use in connection with a next assessment period. From line 522, processing proceeds to line 524 where the assessment indicator is set for the replication link (e.g., assessment indicator=set means that a new next assessment period is about to commence.

The example 500 is illustrates logical processing that may be implemented in at least one embodiment in accordance with techniques herein to implement the particular time periods described in connection with FIG. 8 above. More generally, the assessment period may include any suitable number of time windows during which RTs are measured with the unsolicited data transfer mode enabled and disabled, and each time window may be 1 second or any suitable amount of time. Generally, the assessment period may include at least one time window during which RT is measured with the unsolicited data transfer mode enabled and at least one time window during which RT is measured with the unsolicited data transfer mode disabled. In a similar manner, the amount of time for which the selected setting of the unsolicited data transfer mode remains may be 2 minutes, as described in connection with FIGS. 8 and 9. More generally, the amount of time for which the selected setting of the unsolicited data transfer mode remains may be any suitable amount of time.

In at least one embodiment in accordance with techniques herein, the repeated ongoing continual processing performed for cycles as described herein may be included in dynamic assessment mode processing. The dynamic assessment mode processing may be performed based on whether an associated setting is enabled or disabled. If enabled, the dynamic assessment mode processing as described herein (e.g., FIGS. 8 and 9) may be performed. Otherwise, if disabled, the dynamic assessment mode processing as described herein (e.g., FIGS. 8 and 9) may not be performed. In at least one embodiment, if the dynamic assessment mode processing is disabled, whether unsolicited data transfer mode is enabled or disabled may be performed in accordance with another second setting. The second setting, an unsolicited data transfer mode setting, may be, for example, a manual setting, user specified setting, default setting, or specified configuration setting, indicating whether unsolicited data transfer mode is enabled or disabled. The second setting may be per replication link or may alternatively be a global setting affecting all replication links. In at least one embodiment, the second setting remains in effect until modified, such as by a user. Generally, the second setting has a value of enabled or disabled that is not determined using dynamic mode assessment processing as described herein. For example, in at least one embodiment, the second setting or unsolicited data transfer mode setting may be manually modified by a user.

In at least one embodiment including both the dynamic assessment mode setting and the second setting or unsolicited data transfer mode setting, the dynamic assessment mode setting may override the second setting or unsolicited data transfer mode setting. For example, reference is made to FIG. 10.

The example 300 of FIG. 10 illustrates the action taken with respect to different combinations of settings for the dynamic assessment mode 302 and unsolicited data transfer mode 304. The example 300 includes a table with the following columns: dynamic assessment mode setting 302, unsolicited data transfer mode setting 304 and action 306. Row 310 indicates when the dynamic assessment mode setting is 1 (in column 302) thereby enabling dynamic assessment mode processing such as described herein (e.g., FIGS. 8 and 9) and the unsolicited data transfer mode setting is 0 or 1 (don't care X as in column 304), then the unsolicited data transfer mode is dynamically and automatically determined over time (306) using the dynamic assessment mode processing as described herein (e.g., FIG. 8).

Row 312 indicates when the dynamic assessment mode setting is 0 (in column 302) thereby disabling dynamic assessment mode processing such as described herein (e.g., FIGS. 8 and 9) and the unsolicited data transfer mode setting is 0 (as in column 304), then the unsolicited data transfer mode remains disabled until manually modified.

Row 314 indicates when the dynamic assessment mode setting is 0 (in column 302) thereby disabling dynamic assessment mode processing such as described herein (e.g., FIGS. 8 and 9) and the unsolicited data transfer mode setting is 1 (as in column 304), then the unsolicited data transfer mode remains enabled until manually modified.

In at least one embodiment, enabling the unsolicited data transfer mode may only be allowable when the current replication mode or configuration is one of a defined set. In at least one embodiment, unsolicited data transfer such as illustrated in connection with FIG. 7 may only be allowed in connection with synchronous replication, such as described in connection with FIG. 4, or in connection with an active-active replication configuration with synchronous replication, such as in connection with FIG. 5. Thus, in such an embodiment, the dynamic assessment mode processing described herein may be automatically disabled (set to 0) for all non-synchronous replication write operations over a replication link. Put another way, the dynamic assessment mode processing described herein may be automatically disabled (set to 0) if a current replication mode or configuration with respect to a replication link is not one of the modes or configurations of the defined set. In such an embodiment, the unsolicited data transfer mode setting may also be disabled (set to 0) if a current replication mode or configuration with is not one of the modes or configurations of the defined set. For example, if the replication link is used for asynchronous replication mode, the dynamic assessment mode setting/processing may be automatically disabled and the unsolicited data transfer mode setting may be automatically disabled.

In at least one embodiment, the unsolicited data transfer mode may only be allowable when there are no other write accelerators in effect. Generally, write accelerators are known in the art and may be enabled to improve I/O performance over a link by reducing the effect of transport latency on the I/O operations. In at least one embodiment, if there are write accelerators present on a replication link, unsolicited data transfer mode processing as illustrated in FIG. 7 may not be performed. Thus, if there are write accelerators present on a replication link, the dynamic assessment mode setting may be disabled (set to 0) and the unsolicited data transfer mode setting may be set to 0 thereby disabling unsolicited data transfer.

It should be noted that examples herein use average write I/O response time (RT) as the metric in connection with generally evaluating or determining whether performance is better for a replication link with unsolicited data transfer mode enabled or disabled. More generally, an embodiment in accordance with techniques herein may use any suitable performance metric. For example, an embodiment may use data transfer rate (e.g., megabytes per second) as measured for the replication link in connection with write operations issued over the replication link. Additionally, it should be noted that in at least one embodiment, the size of the write data payload of write operations issued over replication links for replication processing may be a same fixed size such as a track or block. In contrast, a host write I/O operation (or more generally client issued write I/O operation) issued to the local R1 system may have a write data payload that varies in size. In such an embodiment, the single host write I/O operation pay have its write data payload partitioned into multiple equal size chunks (e.g., each of which may be a single track or block) where each such chunk may be replicated or transferred from the local R1 system to the remote R2 system in a single replication write operation over the replication link.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining replication modes comprising:

configuring one or more first logical devices of a first system and one or more second logical devices of a second system for active-active synchronous data replication, wherein writes to each logical device of the first one or more logical devices of the first system are automatically synchronously replicated to a corresponding logical device of the one or more second logical devices of the second system and wherein writes to each logical device of the one or more second logical devices of the second system are automatically synchronously replicated to a corresponding logical device of the one or more first logical devices of the first system, wherein each logical device of the one or more first logical devices and its corresponding logical device of the one or more second logical devices are configured and identified as a same logical device to a host, wherein the host issues first I/Os to said same logical device over a first path between the host and the first system and where the first I/Os are directed to one of the first one or more logical devices configured as said same logical device, and wherein the host issues second I/Os to said same logical device over a second path between the host and the second system and where the second I/Os are directed to one of the second one or more logical devices configured as said same logical device, wherein a plurality of links between the first system and the second system include a first link and a second link, wherein the plurality of links are used for replicating data between the one or more first logical devices of the first system and the one or more second logical devices of the second system; and periodically assessing each of the first link and the second link, independently and individually, to determine whether to enable or disable unsolicited data transfer mode for a next time period for synchronously replicating data between the first system and the second system, wherein said assessing includes:

performing first assessment processing to determine whether to enable or disable the unsolicited data transfer mode for the first link for a first time period for synchronously replicating data between the one or more first logical devices of the first system and the one or more second logical devices of the second system, wherein said first assessment processing includes:

determining, in accordance with a first response time obtained while the unsolicited data transfer mode is enabled for synchronous replication using the first link and a second response time obtained while the unsolicited data transfer mode is disabled for synchronous replication using the first link, whether to enable or disable unsolicited data transfer mode for the first link for synchronously replicating data over the first link for the first time period; and performing second assessment processing to determine whether to enable or disable the unsolicited data transfer mode for the second link for the first time period for synchronously replicating data between the one or more first logical devices of the first system and the one or more second logical devices of the second system, wherein said second assessment processing further includes:

determining, in accordance with a third response time obtained while the unsolicited data transfer mode is enabled for synchronous replication using the second link and a fourth response time obtained while the unsolicited data transfer mode is disabled for synchronous replication using the second link, whether to enable or disable unsolicited data transfer mode for the first link for synchronously replicating data over the second link for the first time period.

2. The method of claim 1, wherein said first assessment processing further comprises:

enabling the unsolicited data transfer mode for the first link;

issuing, while the unsolicited data transfer mode is enabled for the first link, a first set of one or more write operations over the first link, wherein the first link between the first system and the second system is used for data replication to replicate data that is written to the one or more first logical devices of the first system to the one or more second logical devices of the second system, wherein the unsolicited data transfer mode, when enabled for the first link, allows the first system to send write data payload of a write operation to the second system over the first link without receiving an acknowledgement from the second system regarding receipt of a write command block for the write operation;

disabling the unsolicited data transfer mode for the first link;

issuing, while the unsolicited data transfer mode is disabled for the first link, a second set of one or more write operations over the first link, wherein the unsolicited data transfer mode, when disabled for the first link, does not send write data payload of the write operation to the second system over the first link without receiving the acknowledgement from the second system regarding receipt of a write command block for the write operation;

determining the first response time for the first link in accordance with said issuing the first set of one or more write operations from the first system to the second system while the unsolicited data transfer mode is enabled;

determining the second response time for the first link in accordance with said issuing the second set of one or more write operations from the first system to the second system while the unsolicited data transfer mode is disabled; and determining, in accordance with the first response time and the second response time, whether to enable or disable the unsolicited data transfer mode for the first link for the first time period.

3. The method of claim 2, wherein it is determined, in accordance with the first response time and the second response time, to enable the unsolicited data transfer mode for the first link for the first time period.

4. The method of claim 3, wherein, while the unsolicited data transfer mode is enabled, the method further includes performing processing comprising:

receiving a client write operation that writes to a target logical device included in the first one or more logical devices of the first system, wherein the target logical device and another logical device of the one or more second logical devices of the second system are corresponding logical devices configured for data replication;

sending a first write command block for the client write operation from the first system to the second system over the first link; and sending first write data payload for the client write operation from the first system to the second system over the first link, wherein the first write data payload for the client write operation is sent from the from the first system to the second system prior to the first system receiving an acknowledgement from the second system regarding receipt of the first write command block.

5. The method of claim 2, wherein it is determined, in accordance with the first response time and the second response time, to disable the unsolicited data transfer mode for the first link for the first time period.

6. The method of claim 5, wherein, while the unsolicited data transfer mode is disabled, the method further includes performing processing comprising:
receiving a client write operation that writes to a target logical device included in the first one or more logical devices of the first system, wherein the target logical device and another logical device of the one or more second logical devices of the second system are corresponding logical devices configured for data replication;
sending a first write command block for the client write operation from the first system to the second system over the first link;
receiving an acknowledgement from the second system regarding receipt of the first write command block; and
responsive to receiving the acknowledgement from the second system regarding receipt of the first write command block, sending first write data payload for the client write operation from the first system to the second system over the first link, wherein the first write data payload for the client write operation is only sent from the from the first system to the second system upon receiving the acknowledgement from the second system regarding receipt of the first write command block.

7. The method of claim 2, wherein said enabling the unsolicited data transfer mode for the first link, said issuing the first set of one or more write operations, said disabling the unsolicited data transfer mode, said issuing the second set of one or more write operations, said determining the first response time for the first link, said determining the second response time for the first link, and said determining, in accordance with the first response time and the second response time, whether to enable or disable the unsolicited data transfer mode for the first link are included in first processing performed with respect to the first link, and wherein the method includes:
repeating said first processing for the first link after the first time period has elapsed.

8. The method of claim 7, wherein said first processing is included in dynamic assessment mode processing having an associated setting capable of being enabled or disabled.

9. The method of claim 8, wherein when the associated setting of dynamic assessment mode processing is enabled, said the dynamic mode assessment processing is performed periodically to dynamically and automatically determine whether to enable or disable the unsolicited data transfer mode for the first link at multiple points in time.

10. The method of claim 9, wherein when the associated setting of dynamic assessment mode processing is disabled, said dynamic mode assessment processing is not performed and another setting is used to determine whether to enable or disable the unsolicited data transfer mode for the first link.

11. The method of claim 10, wherein the another setting is any of a user-specified, manual, configuration, and default setting indicating whether to enable or disable the unsolicited data transfer mode for the first link.

12. The method of claim 10, further comprising:
determining, in accordance with a current replication mode associated with the first link, whether to enable or disable the dynamic assessment mode processing with respect to the first link.

13. The method of claim 12, further comprising:
determining whether the current replication mode associated with the first link is included in a specified set of one or more replication modes; and
responsive to determining the current replication mode associated with the first link is included in the specified set of one or more replication modes, enabling the dynamic assessment mode processing for the first link, and otherwise disabling the dynamic assessment mode processing for the first link.

14. The method of claim 13, wherein the specified set includes synchronous replication.

15. The method of claim 13, wherein the specified set includes active-active replication wherein a client is allowed to issue I/O operations to the first system and also allowed to issue writes to the second system, and wherein write data of client I/O operations is replicated over the first link using synchronous write operations.

16. The method of claim 2, wherein said determining, in accordance with the first response time and the second response time, whether to enable or disable the unsolicited data transfer mode for the first link for the first time period further includes:
determining, in accordance with a specified tolerance limit, whether the first response time is less than or equal to the second response time, wherein the first response time denotes an average measured response time for said first set of one or more write operations issued from the first system to the second system while unsolicited data transfer mode is enabled, and wherein the second response time denotes an average measured response time for said second set of one or more write operations issued from the first system to the second system while unsolicited data transfer mode is disabled; and
responsive to determining, in accordance with the specified tolerance limit, that the first response time is less than or equal to the second response time, enabling unsolicited data transfer mode for the first link, and otherwise disabling unsolicited data transfer mode for the first link.

17. The method of claim 2, further comprising:
enabling the unsolicited data transfer mode for the first link used for data replication between the first system and the second system for a first time window;
issuing, during the first time window while the unsolicited data transfer mode is enabled for the first link, a first plurality of write operations over the first link;
disabling the unsolicited data transfer mode for the first link used for data replication between the first system and the second system for a second time window;
issuing, during the second time window while the unsolicited data transfer mode is disabled for the first link, a second plurality of write operations over the first link;
enabling the unsolicited data transfer mode for the first link used for data replication between the first system and the second system for a third time window;
issuing, during the third time window while the unsolicited data transfer mode is enabled for the first link, a third plurality of write operations over the first link;
disabling the unsolicited data transfer mode for the first link used for data replication between the first system and the second system for a fourth time window; and
issuing, during the fourth time window while the unsolicited data transfer mode is disabled for the first link, a fourth plurality of write operations over the first link.

18. The method of claim 17, wherein the first set of one or more write operations includes the first plurality of write operations and the third plurality of write operations, wherein the first response time for the first link is determined in accordance with measured response times for write operations including the first plurality of write operations and the third plurality of write operations, wherein the second set of one or more write operations includes the second plurality of write operations and the fourth plurality of write operations, and wherein the second response time for the first link is determined in accordance with measured response times for write operations including the second plurality of write operations and the fourth plurality of write operations.

19. A non-transitory computer readable medium comprising code stored thereon that, when executed, performs a method of determining replication modes comprising:
configuring one or more first logical devices of a first system and one or more second logical devices of a second system for active-active synchronous data replication, wherein writes to each logical device of the first one or more logical devices of the first system are automatically synchronously replicated to a corresponding logical device of the one or more second logical devices of the second system and wherein writes to each logical device of the one or more second logical devices of the second system are automatically synchronously replicated to a corresponding logical device of the one or more first logical devices of the first system, wherein each logical device of the one or more first logical devices and its corresponding logical device of the one or more second logical devices are configured and identified as a same logical device to a host, wherein the host issues first I/Os to said same logical device over a first path between the host and the first system and where the first I/Os are directed to one of the first one or more logical devices configured as said same logical device, and wherein the host issues second I/Os to said same logical device over a second path between the host and the second system and where the second I/Os are directed to one of the second one or more logical devices configured as said same logical device, wherein a plurality of links between the first system and the second system include a first link and a second link, wherein the plurality of links are used for replicating data between the one or more first logical devices of the first system and the one or more second logical devices of the second system; and
periodically assessing each of the first link and the second link, independently and individually, to determine whether to enable or disable unsolicited data transfer mode for a next time period for synchronously replicating data between the first system and the second system, wherein said assessing includes:
performing first assessment processing to determine whether to enable or disable the unsolicited data transfer mode for the first link for a first time period for synchronously replicating data between the one or more first logical devices of the first system and the one or more second logical devices of the second system, wherein said first assessment processing includes:
determining, in accordance with a first response time obtained while the unsolicited data transfer mode is enabled for synchronous replication using the first link and a second response time obtained while the unsolicited data transfer mode is disabled for synchronous replication using the first link, whether to enable or disable unsolicited data transfer mode for the first link for synchronously replicating data over the first link for the first time period; and
performing second assessment processing to determine whether to enable or disable the unsolicited data transfer mode for the second link for the first time period for synchronously replicating data between the one or more first logical devices of the first system and the one or more second logical devices of the second system, wherein said second assessment processing further includes:
determining, in accordance with a third response time obtained while the unsolicited data transfer mode is enabled for synchronous replication using the second link and a fourth response time obtained while the unsolicited data transfer mode is disabled for synchronous replication using the second link, whether to enable or disable unsolicited data transfer mode for the first link for synchronously replicating data over the second link for the first time period.

20. A system comprising:
a processor; and
a memory comprising code stored thereon that, when executed, performs a method of determining replication modes comprising:
configuring one or more first logical devices of a first system and one or more second logical devices of a second system for active-active synchronous data replication, wherein writes to each logical device of the first one or more logical devices of the first system are automatically synchronously replicated to a corresponding logical device of the one or more second logical devices of the second system and wherein writes to each logical device of the one or more second logical devices of the second system are automatically synchronously replicated to a corresponding logical device of the one or more first logical devices of the first system, wherein each logical device of the one or more first logical devices and its corresponding logical device of the one or more second logical devices are configured and identified as a same logical device to a host, wherein the host issues first I/Os to said same logical device over a first path between the host and the first system and where the first I/Os are directed to one of the first one or more logical devices configured as said same logical device, and wherein the host issues second I/Os to said same logical device over a second path between the host and the second system and where the second I/Os are directed to one of the second one or more logical devices configured as said same logical device, wherein a plurality of links between the first system and the second system include a first link and a second link, wherein the plurality of links are used for replicating data between the one or more first logical devices of the first system and the one or more second logical devices of the second system; and
periodically assessing each of the first link and the second link, independently and individually, to determine whether to enable or disable unsolicited data transfer mode for a next time period for synchronously replicating data between the first system and the second system, wherein said assessing includes:

performing first assessment processing to determine whether to enable or disable the unsolicited data transfer mode for the first link for a first time period for synchronously replicating data between the one or more first logical devices of the first system and the one or more second logical devices of the second system, wherein said first assessment processing includes:

determining, in accordance with a first data transfer rate obtained while the unsolicited data transfer mode is enabled for synchronous replication using the first link and a second data transfer rate obtained while the unsolicited data transfer mode is disabled for synchronous replication using the first link, whether to enable or disable unsolicited data transfer mode for the first link for synchronously replicating data over the first link for the first time period; and performing second assessment processing to determine whether to enable or disable the unsolicited data transfer mode for the second link for the first time period for synchronously replicating data between the one or more first logical devices of the first system and the one or more second logical devices of the second system, wherein said second assessment processing further includes:

determining, in accordance with a third data transfer rate obtained while the unsolicited data transfer mode is enabled for synchronous replication using the second link and a fourth data transfer rate obtained while the unsolicited data transfer mode is disabled for synchronous replication using the second link, whether to enable or disable unsolicited data transfer mode for the first link for synchronously replicating data over the second link for the first time period.

* * * * *